United States Patent
Lawson et al.

(10) Patent No.: US 10,184,532 B2
(45) Date of Patent: Jan. 22, 2019

(54) ELECTRONICS CONTROL OF MOTORCYCLE CLUTCH

(71) Applicants: Martin E. Lawson, Somerset, WI (US); William E. Lawson, Somerset, WI (US)

(72) Inventors: Martin E. Lawson, Somerset, WI (US); William E. Lawson, Somerset, WI (US)

(*) Notice: Subject to any disclaimer, the term of this patent is extended or adjusted under 35 U.S.C. 154(b) by 22 days.

(21) Appl. No.: 15/031,075

(22) PCT Filed: Oct. 21, 2014

(86) PCT No.: PCT/US2014/061538
§ 371 (c)(1),
(2) Date: Apr. 21, 2016

(87) PCT Pub. No.: WO2015/061296
PCT Pub. Date: Apr. 30, 2015

(65) Prior Publication Data
US 2016/0281802 A1    Sep. 29, 2016

Related U.S. Application Data

(60) Provisional application No. 61/893,430, filed on Oct. 21, 2013.

(51) Int. Cl.
*F16D 48/06* (2006.01)
*B62K 23/06* (2006.01)
(Continued)

(52) U.S. Cl.
CPC .............. *F16D 48/06* (2013.01); *B62K 23/06* (2013.01); *B60W 10/02* (2013.01); *B60W 30/182* (2013.01);
(Continued)

(58) Field of Classification Search
CPC . Y10T 477/753; Y10T 477/76; Y10T 477/78; Y10T 477/6437; B60W 10/02;
(Continued)

(56) References Cited

U.S. PATENT DOCUMENTS 8,515,638 B2 * 8/2013 Saitoh ................... F16D 48/06
192/31
2002/0016665 A1   2/2002 Ulyanov et al.
(Continued)

FOREIGN PATENT DOCUMENTS

EP          1669626 A2    6/2006
EP          2211075 A2    7/2010
(Continued)

OTHER PUBLICATIONS

International Search Report and Written Opinion dated Feb. 19, 2015 for corresponding International Application No. PCT/US2014/061538, filed Oct. 21, 2014.

*Primary Examiner* — Roger L Pang
(74) *Attorney, Agent, or Firm* — Peter J. Ims; Westman, Champlin & Koehler, P.A.

(57) ABSTRACT

An electronic control system for a clutch on a motorcycle includes a sensor configured to measure a parameter indicative of a performance or speed of the motorcycle. The sensor is configured to provide an input signal corresponding to the parameter to a computer control system, which includes a microprocessor and memory. The microprocessor and memory are configured to manipulate the input signal and the microprocessor is configured to output a control signal that controls an actuator that is configured to manipulate a position of the clutch.

18 Claims, 11 Drawing Sheets

(51) Int. Cl.
*B60W 30/182* (2012.01)
*B60W 10/02* (2006.01)
*B60W 30/20* (2006.01)
*B60W 30/186* (2012.01)

(52) U.S. Cl.
CPC ..... *B60W 30/186* (2013.01); *B60W 2030/203* (2013.01); *F16D 2500/10412* (2013.01); *F16D 2500/1117* (2013.01); *F16D 2500/3067* (2013.01); *F16D 2500/3108* (2013.01); *F16D 2500/3146* (2013.01); *F16D 2500/7041* (2013.01); *F16D 2500/70668* (2013.01); *Y10T 477/6437* (2015.01); *Y10T 477/753* (2015.01); *Y10T 477/76* (2015.01); *Y10T 477/78* (2015.01)

(58) Field of Classification Search
CPC ................ B60W 30/182; F16D 48/06; F16D 2500/10412; F16D 2500/70668; F16D 2500/7041; F16D 2500/3108; F16D 2500/3067; F16D 2500/1117; F16D 2500/3146; B62K 23/06

USPC .......................................................... 701/67
See application file for complete search history.

(56) References Cited

U.S. PATENT DOCUMENTS

| | | | |
|---|---|---|---|
| 2008/0125285 A1* | 5/2008 | Takeuchi | B60W 10/02 477/79 |
| 2009/0287387 A1* | 11/2009 | Tomoda | F16D 25/086 701/68 |
| 2013/0096785 A1 | 4/2013 | Kohler et al. | |
| 2013/0173126 A1* | 7/2013 | Ruebsam | B60W 10/02 701/67 |

FOREIGN PATENT DOCUMENTS

| | | | | |
|---|---|---|---|---|
| EP | 2253861 A2 * | 11/2010 | ........... | F16D 48/064 |
| SU | 1199673 A1 | 12/1985 | | |

* cited by examiner

ELECTRONICS CONTROL OF MOTORCYCLE CLUTCH

CROSS-REFERENCE TO RELATED APPLICATION

This Application is a Section 371 National Stage Application of International Application No. PCT/US2014/061538, filed Oct. 21, 2014 and published as WO 2015/061296 on Apr. 30, 2015, which claims priority to U.S. Patent Application No. 61/893,430, filed on Oct. 21, 2013, the contents of which are hereby incorporated by reference in their entirety.

BACKGROUND

The discussion below is merely provided for general background information and is not intended to be used as an aid in determining the scope of the claimed subject matter.

The present disclosure relates to a control system for a clutch for a motorcycle. More particularly, the present disclosure relates to a compact electronic control system that can be attached to a handlebar of a motorcycle and controls a position of a clutch on a motorcycle.

A typical motorcycle with a manual transmission is engaged with a manually operated clutch that is usually controlled by a hand lever on the left handlebar. The hand lever is typically coupled to the clutch by one of two conventional systems. A first conventional system includes a cable that couples the lever to the clutch. A second conventional system includes the use of a hydraulic master/slave hydraulic system where a small master cylinder is actuated by the clutch lever and the master cylinder activates a slave cylinder through the hydraulic system such that the slave cylinder activates the clutch.

There are other systems that can be used as the clutch, such as a centrifugal clutch combined with a belt type continuously variable transmission (CVT), which are typically used on many scooters. Another example of a clutch includes a pure belt type CVT that is typically used on snowmobiles, where the variable ratio belt drive also acts as the clutch.

However the CVT clutches add additional weight, which may be detrimental to the performance of a motorcycle. So in many instances, the standard system utilizing a manual clutch and a manual transmission may be preferred, as it is the lightest and simplest system.

Especially when the rider is first learning to ride the motorcycle and under some complex off road riding situations, coordinating the movements of a standard clutch utilizing the left hand, the throttle utilizing the right hand and the transmission shifting utilizing the left foot be difficult. To help with this situation and also with the problem of stalling the engine when rotating at a slow revolution per minute (RPM) or when overloading the engine, a clutch system that acts like a centrifugal clutch can be used. The centrifugal clutch aids in alleviating these problem because the centrifugal clutch allows the engine to disengage when the RPMs are too slow or when starting from a stop because the centrifugal clutch is automatically engaged needing the operator to pay attention to the control of the clutch.

There are motorcycle clutch systems that use a mechanical system to engage the conventional multidisc manual clutch, such that the conventional multidisc manual clutch acts like a centrifugal clutch. As the engine speeds up, the clutch is gradually engaged by the mechanical system which can include weights or balls that rotate with the clutch. As the device speeds up, the centrifugal force on the weights causes the weights to ride up a ramped surface which, in turn, forces the clutch into engagement. This type of clutch system requires parts like the weights and springs that may require changing to tune the clutch engaging characteristics for a particular motorcycle and/or rider, which may cause additional weight to the motorcycle, time and expense. For example, all the clutch systems presently currently offered for use on scooters and motorcycles have one preset engaging characteristic, which may not be ideal for a particular motorcycle or rider.

SUMMARY

This Summary herein is provided to introduce a selection of concepts in a simplified form that are further described below in the Detailed Description. This Summary is not intended to identify key features or essential features of the claimed subject matter, nor are they intended to be used as an aid in determining the scope of the claimed subject matter. The claimed subject matter is not limited to implementations that solve any or all disadvantages noted in the Background.

The present disclosure includes an electronic control system for a clutch on a motorcycle. The electronic control includes a sensor configured to measure a parameter indicative of a performance or speed of the motorcycle. The sensor is configured to provide an input signal corresponding to the parameter to a computer control system, which includes a microprocessor and memory. The microprocessor and memory are configured to manipulate the input signal and the microprocessor is configured to output a control signal that controls an actuator that is configured to manipulate a position of the clutch.

The present disclosure includes an electronic control system for a clutch on a motorcycle. The electronic control includes a sensor configured to measure a parameter of a performance or speed of the motorcycle. The sensor is configured to provide an input signal corresponding to the parameter to a computer control system, which includes a microprocessor and memory having a plurality of selectable control program stored thereon. The input signal is processed through one of the selectable control programs and an output signal is sent from the microprocessor to an actuator that is configured to manipulate a position of a clutch to control the rotational rate of the engine.

The present disclosure relates to a combination of a manual control system and an electronic control system for a clutch on a motorcycle. The manual control system is operated utilizing a hand lever, typically attached proximate a left end of handlebars. The electronic control system includes a sensor configured to measure a parameter indicative of a performance or speed of the motorcycle. The sensor is configured to provide an input signal corresponding to the parameter that is transmitted and inputted into a computer control system, which includes a microprocessor and memory having a plurality of selectable control programs stored thereon. Each of the plurality of programs is configured to manipulate the input signal and is configured to send an output to the microprocessor. The microprocessor sends or outputs a corresponding output signal to an actuator that is configured to manipulate a position of the clutch to control the power transmitted to the drive wheel of the motorcycle. The microprocessor and memory are positioned on the hand lever to provide a compact design that does not require significant retrofitting of an existing motorcycle, although the microprocessor and memory can be located on any desirable position on the motorcycle besides the hand lever.

The present disclosure relates to a combination of a manual control system and an electronic control system for a clutch on a motorcycle. The manual control system is operated utilizing a hand lever, typically attached proximate a left end of handlebars. The electronic control system can be configured in series with the manual control system meaning that the electronic control system can be operated independently of the manual control system, but when the manual control system is utilized, the electronic control system is also activated. The electronic control system can be configured in parallel with the manual control system meaning that the electronic control system can be operated independently of the manual control system and vice versa. The electronic control system includes a sensor configured to measure a parameter indicative of performance or speed the motorcycle. The sensor is configured to provide a signal corresponding to the parameter of the motorcycle that is sent to and inputted into a computer control system, which includes a microcomputer comprising a microprocessor and memory having a plurality of selectable control programs stored thereon. Each of the plurality of control programs is configured to manipulate the input signal and is configured to output a corresponding output signal that the microprocessor sends to an actuator mounted to the hand lever. The actuator is configured to manipulate a position of the clutch to control the amount of power provided to a drive wheel. The microprocessor, memory and actuator are positioned on the hand lever to provide a compact design that does not require significant retrofitting of an existing motorcycle.

DETAILED DESCRIPTION

Figure 1:
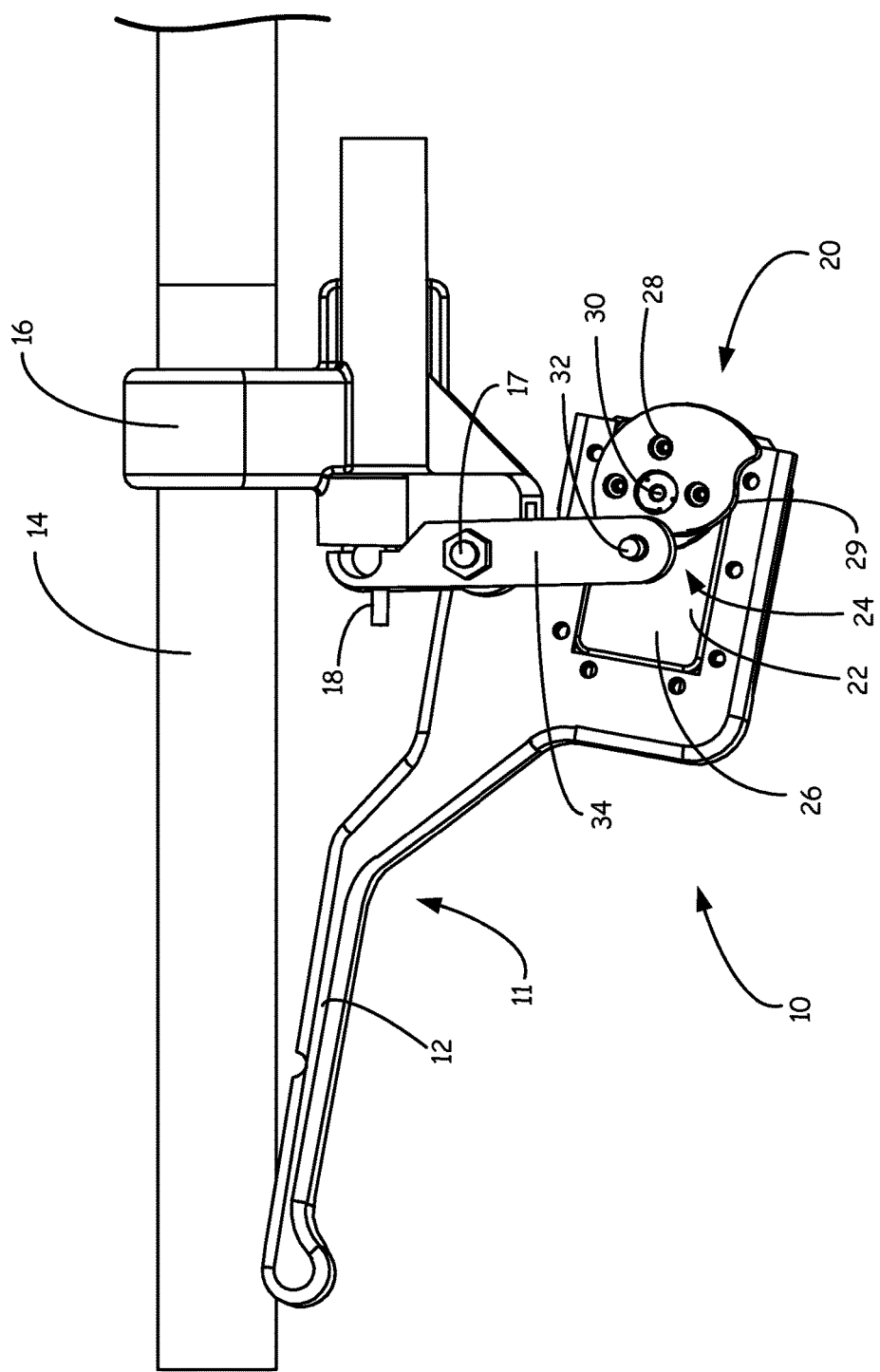
FIG. 1 illustrates an underside of a series configuration of a manual clutch control system with an electronic clutch control system with the electronic clutch control system inactive and the clutch fully disengaged with the manual clutch control system.
Figure 2:
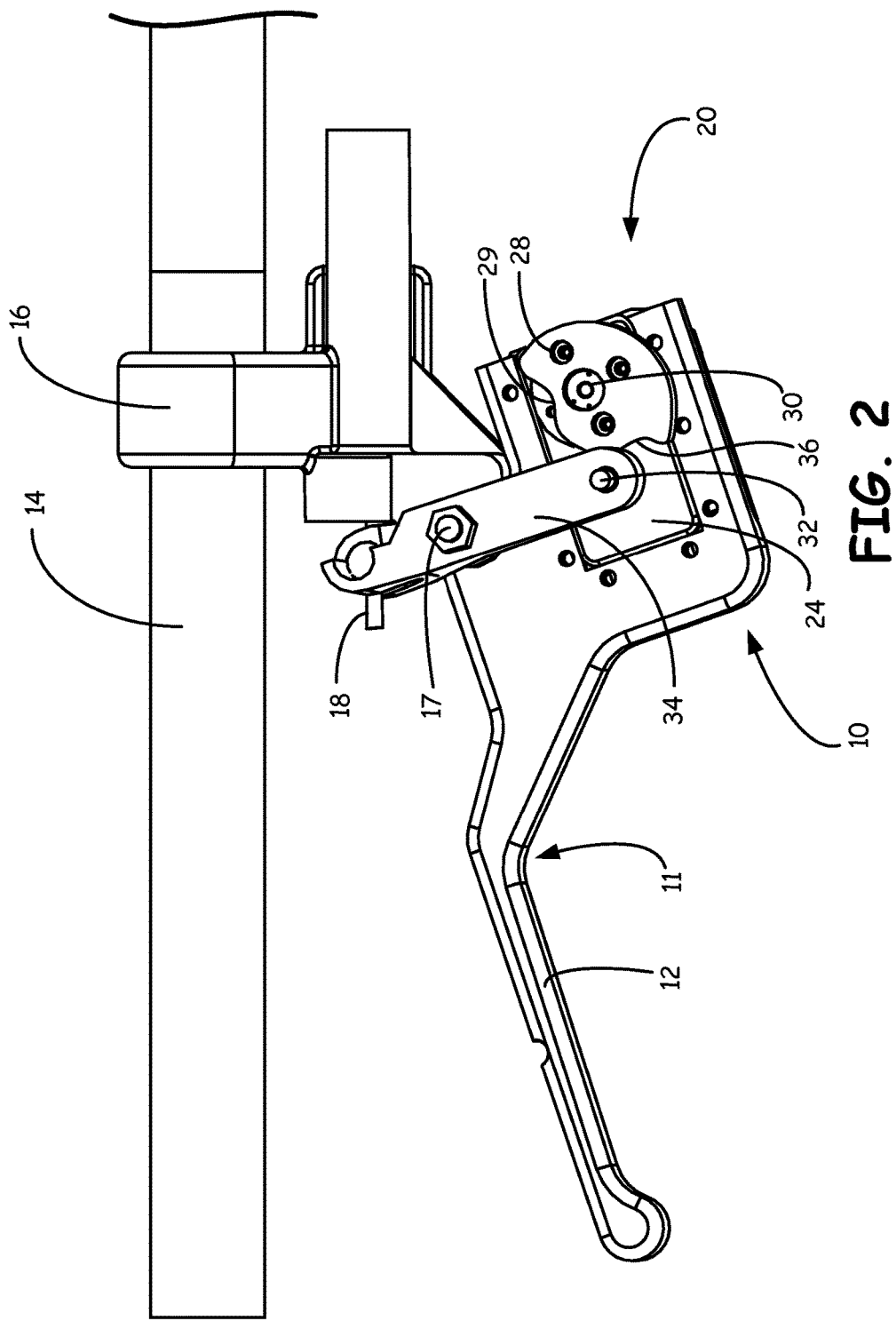
FIG. 2 illustrates an underside of a series configuration of a manual clutch control system and the electronic clutch control system with the electronic clutch control system having an actuator fully disengaging the clutch with the manual clutch control system inactive.
Figure 3:
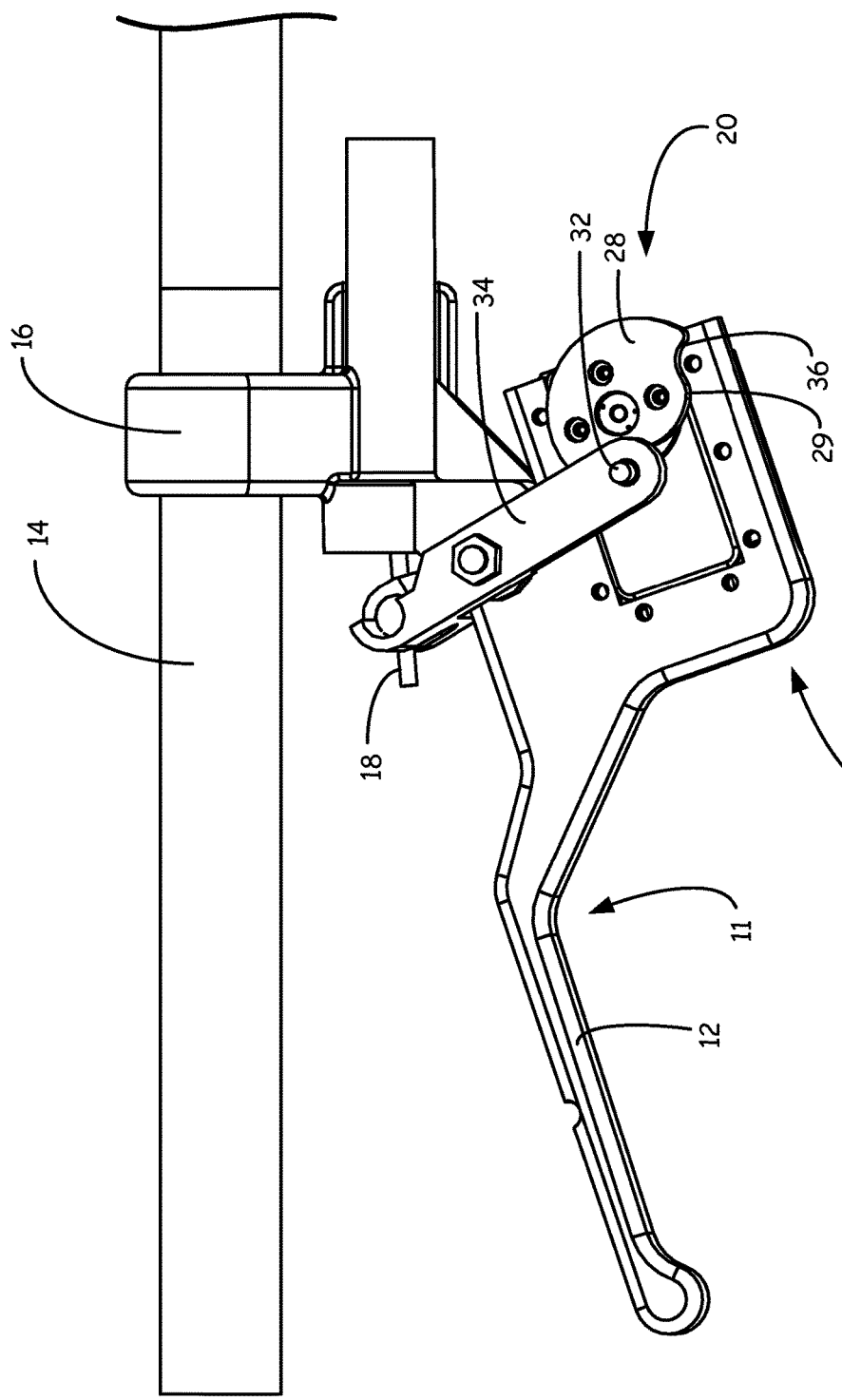
FIG. 3 is another view of the series configuration of the manual clutch control system and the electronic clutch control system both in inactive positions such that the clutch is fully engaged.
Figure 4:
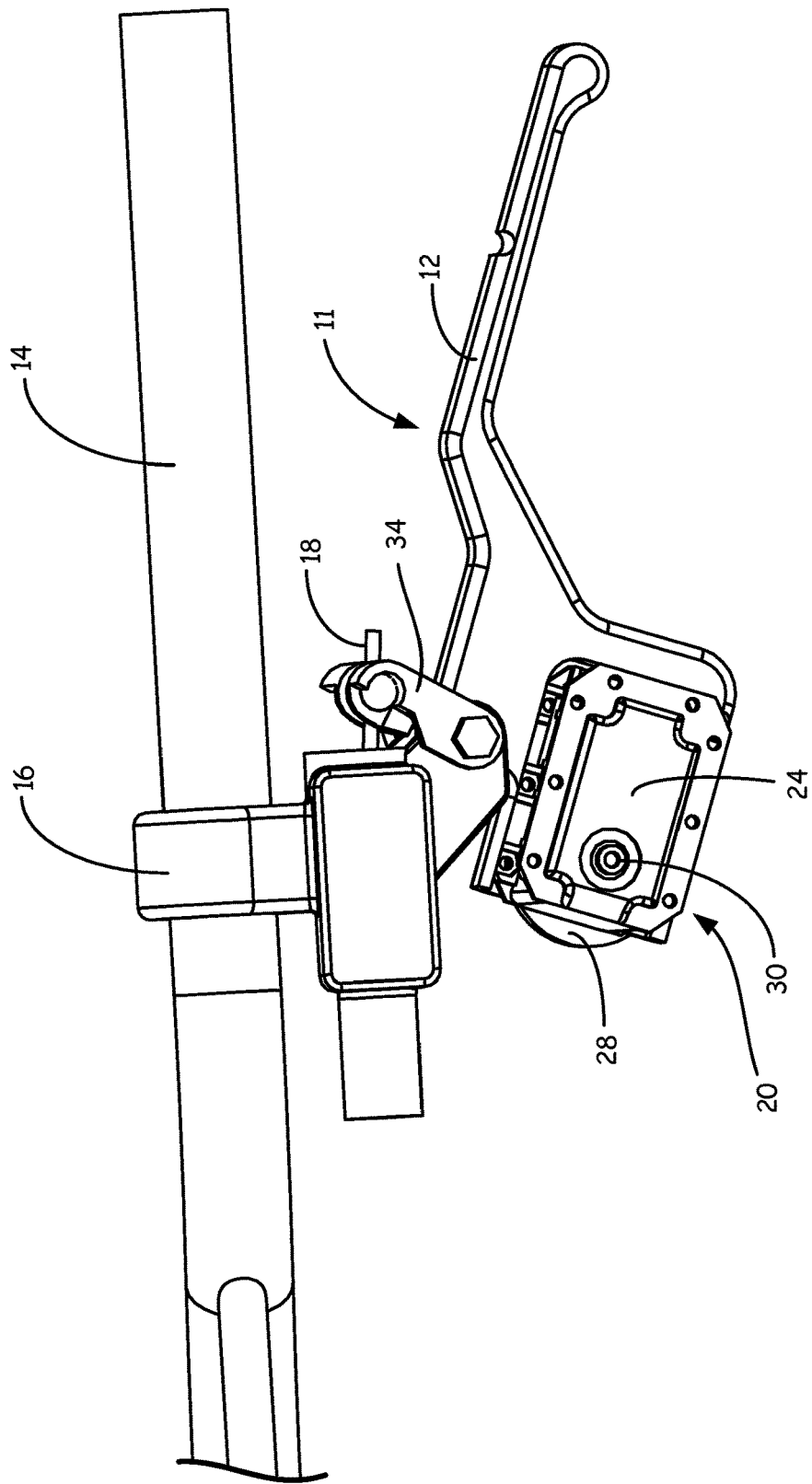
FIG. 4 is a top view of the series configuration of the manual clutch control system and the electronic clutch control system wherein both systems are in the inactive position.
Figure 5:
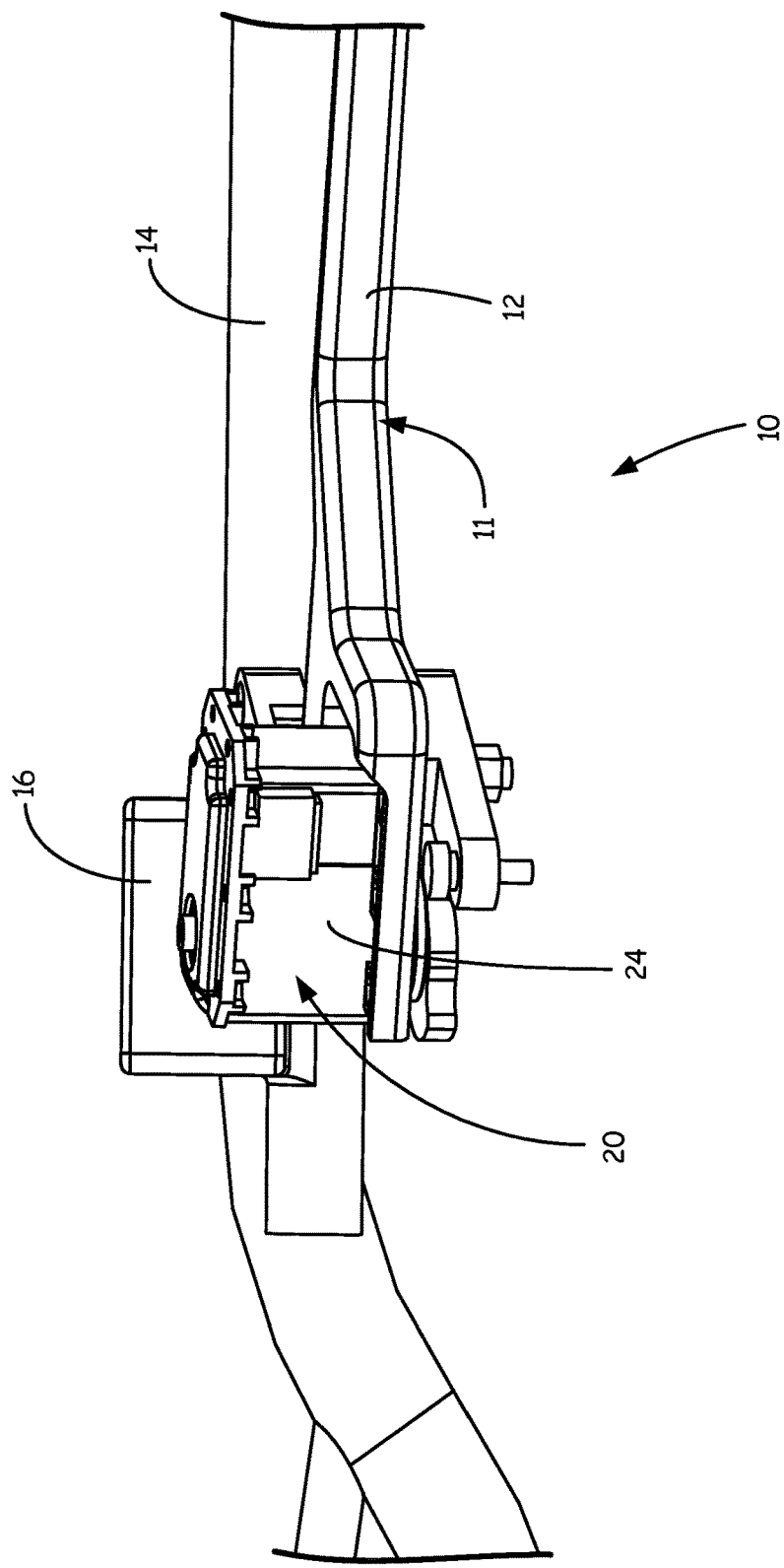
FIG. 5 is a front view of the series configuration of the manual clutch control system and the electronic clutch control system.
Figure 6:
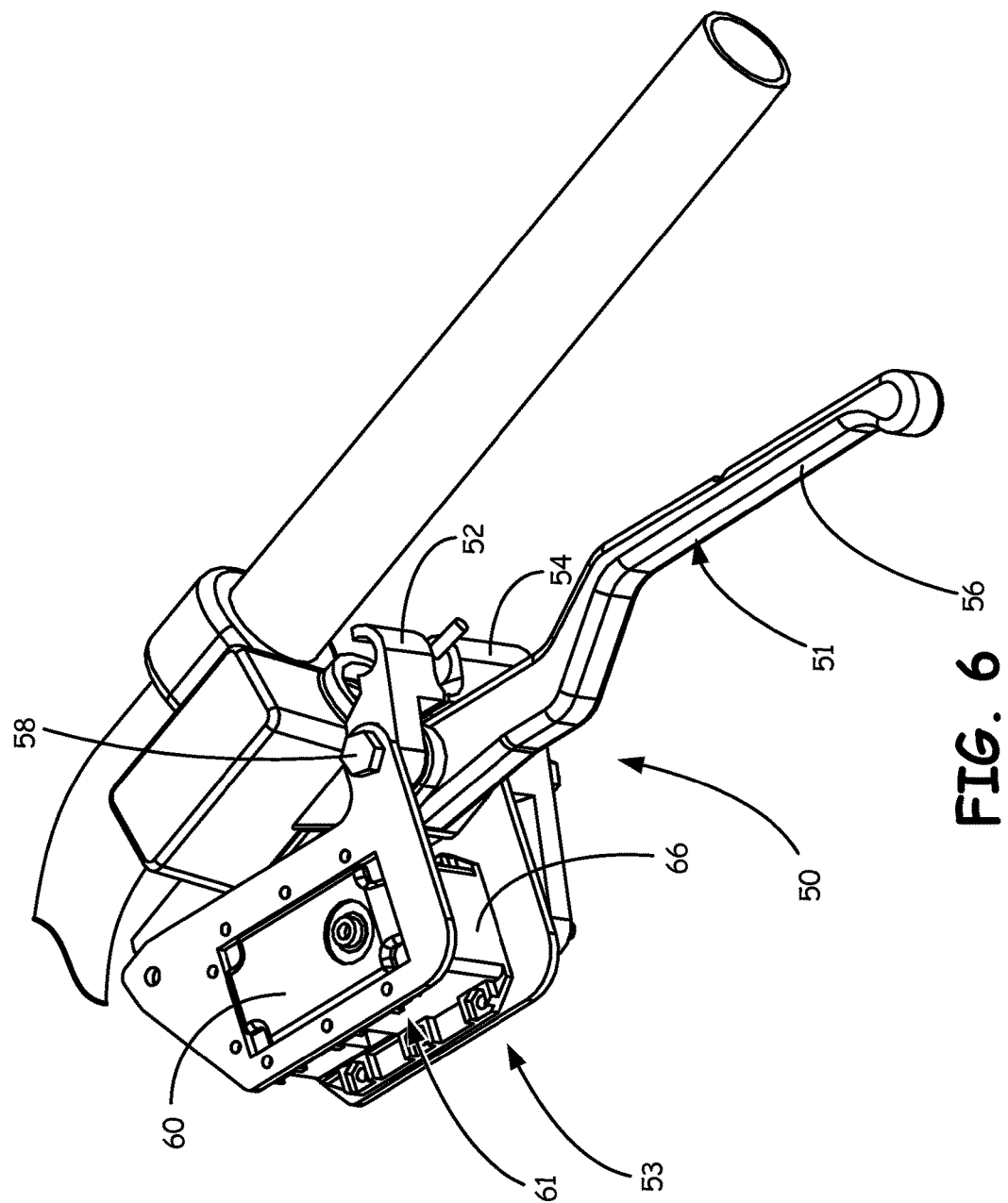
FIG. 6 is a front, top isometric view of a parallel configuration of a manual clutch control system and an electronic clutch control system attached to a handlebar.
Figure 7:
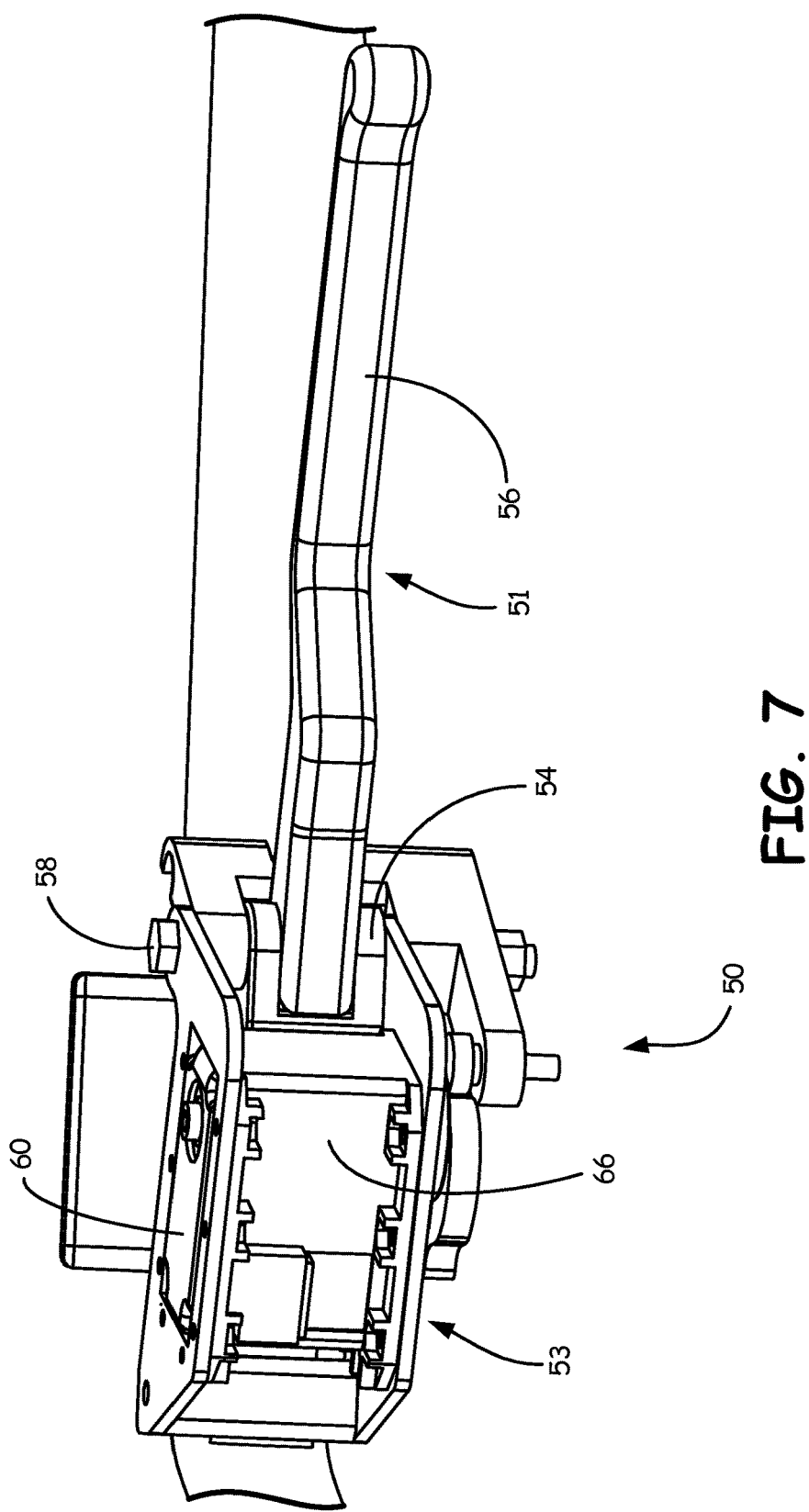
FIG. 7 is a front view of the parallel configuration of the manual clutch control system and the electronic clutch control system attached to a handlebar.
Figure 8:
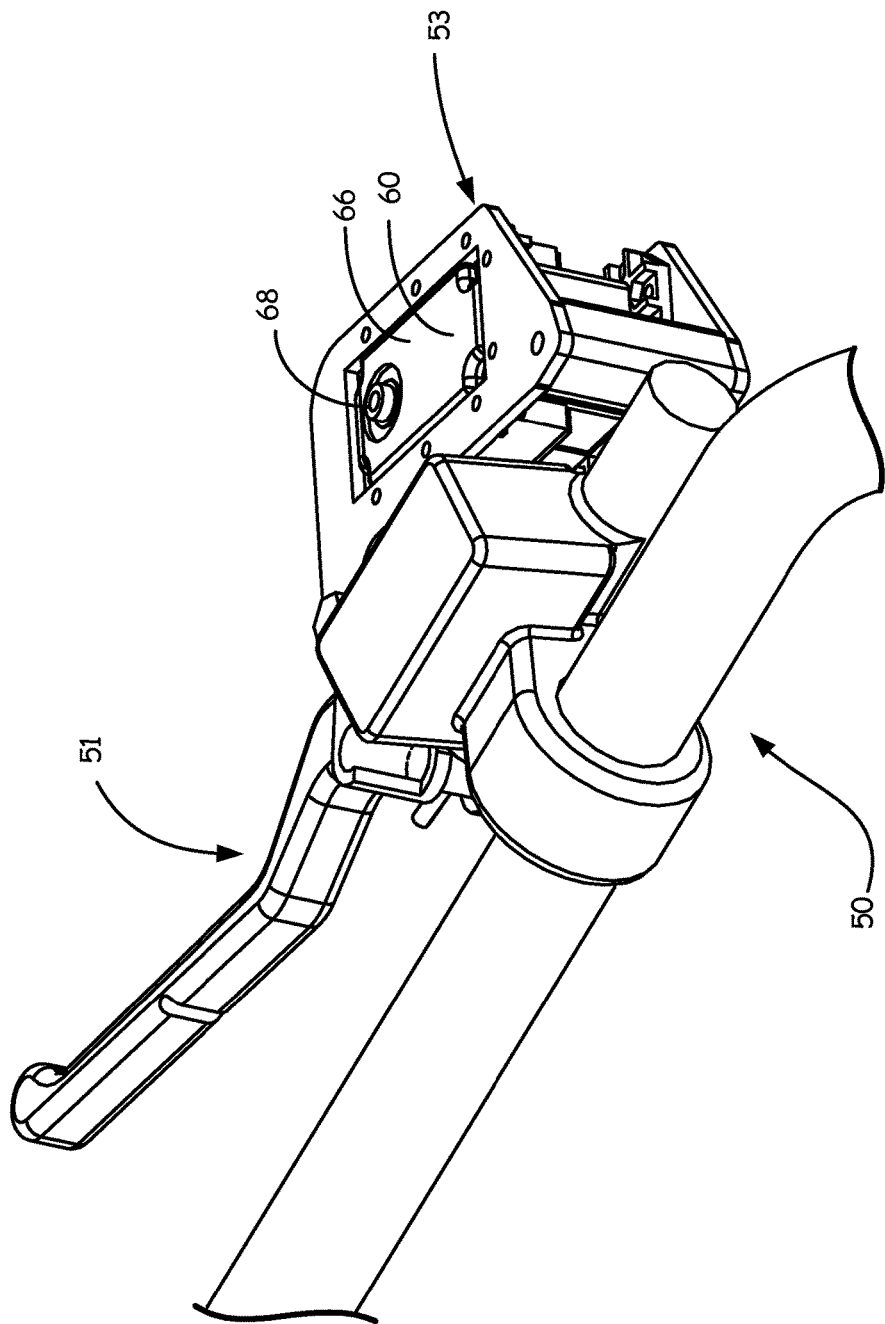
FIG. 8 is a rear, top isometric view of the parallel configuration the manual clutch control system and the electronic clutch control system attached to a handlebar.
Figure 9:
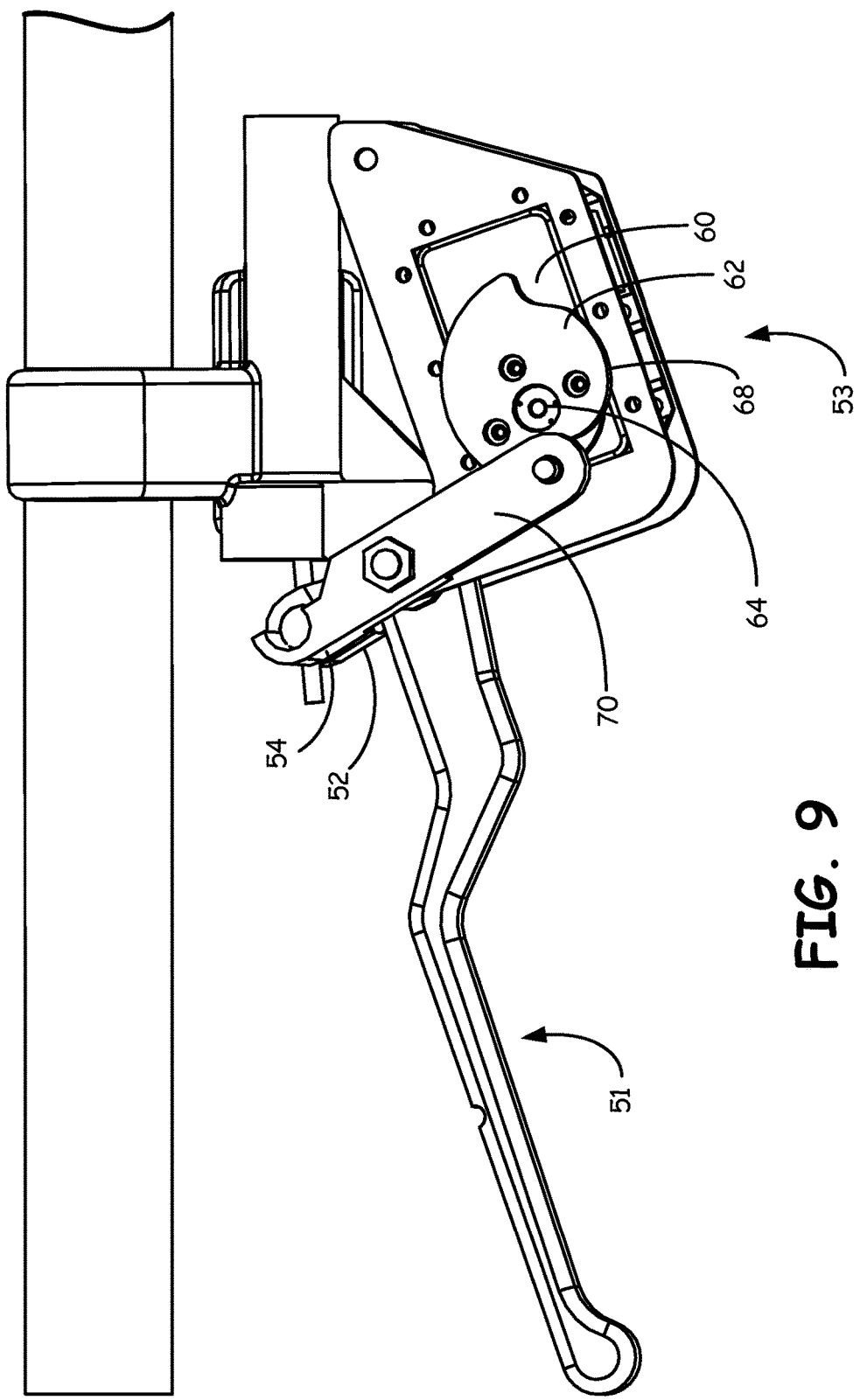
FIG. 9 is a bottom view of the parallel configuration of the manual clutch control system and the electronic clutch control system attached to a handlebar.
Figure 10:
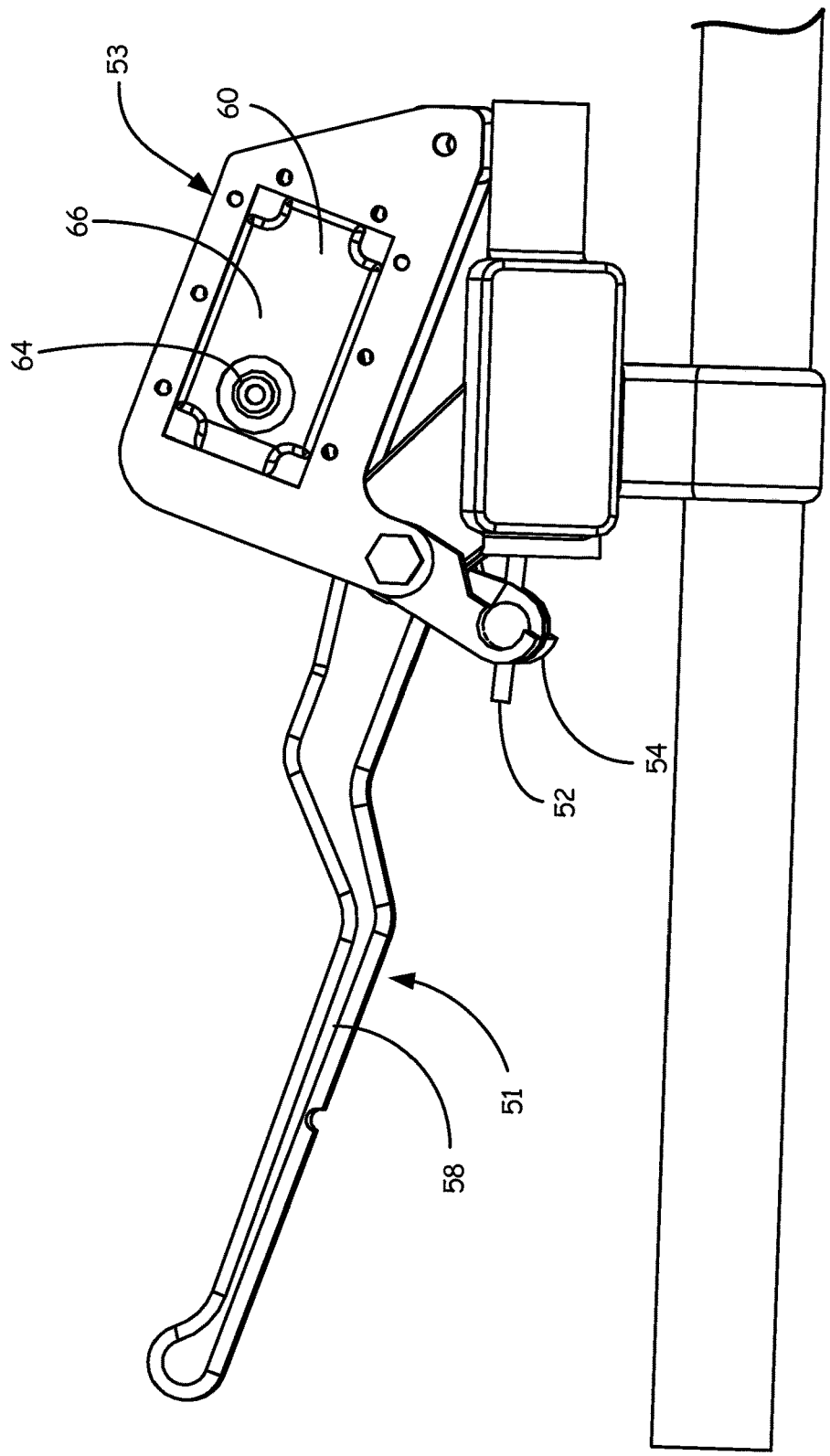
FIG. 10 is a top view of the parallel configuration of the manual clutch control system and the electronic clutch control system attached to a handlebar.

A clutch control system 10 attached to a hand lever 12 on a motorcycle is generally illustrated in FIG. 1. The hand lever 12 is pivotally attached to a handlebar 14 with a mounting bracket 16 secured to the handlebar 14 where the hand lever 12 is attached to the mounting bracket 16 with and a pivot pin or bolt 17 such that the hand lever 12 pivots about the pivot pin or bolt 17.

A clutch can be activated utilizing a manually operated clutch control system 11 where the operator manually pulls the hand lever 12 toward the handlebar 14 to disengage the clutch. The manually operated clutch control system 11 includes bias, such as a spring, to position the hand lever 12 in the clutch engaging position, whether a hydraulic clutch control system or a cable clutch control system.

The present disclosure includes an electronic control system 20 for the master/slave hydraulic control system that can be utilized with the manually operated control system. However, an electronic control for a cable controlled clutch could be constructed utilizing the same principles as utilized for the electronic control of the master/slave hydraulic system.

When a clutch is disengaged with the manually operated control system 11 such that the wheels of the motorcycle are free wheeling, the hand lever 12 is pulled toward the handlebar 14 as illustrated in FIG. 1 and causes a link 18 to push the master cylinder piston which in turn causes the slave cylinder to move and causes the clutch to disengage. When utilizing a cable system to actuate the clutch, when the hand lever 12 is pulled toward the handlebar 14, tension is placed on the cable to pull the cable and engage the clutch. The most significant difference between the two systems is that in a hydraulic system, the hand lever 12 pushes on a master cylinder while in the cable actuated system, the lever pulls on the cable.

As illustrated in FIGS. 1-5, the electronic control system 20 can be in series with the manually operated control system 11, meaning that the electronic control system 20 can be operated independently of the manual control system 11, but when the manual control system 11 is utilized, the electronic control system 20 also is activated. As illustrated in FIGS. 7-11, the electronic control system 53 can also be in parallel with the manual control system 11, meaning that the electronic control system 53 can be operated independently of the manual control system 11 and vice versa.

While utilizing a conventional manual control system 11 as discussed above may be beneficial, there are many instances where the rider would desire that the clutch be automatically controlled, not only for ease of use, but also when the riding situation becomes complex and/or the rider desires to maximize the efficiency or power of the motorcycle. To meet these objectives, the present disclosure includes the electronic control system 20 along with the standard manual control system 11 for manipulating the position of the clutch. As illustrated, the electronic control system 20 is located on the hand lever 12 and is capable of actuating the master cylinder actuating link 18 for a hydraulic clutch, and hence the slave cylinder to control the position of the clutch and the amount of power transmitted to the drive wheel of the motorcycle. It is also contemplated that the electronic system 20 could also control a clutch by manipulating a position of a cable. While the electronic control system 20 is illustrated as being located on the hand lever 12, it is contemplated that the electronic control system 20 can be located at other locations on the motorcycle.

Referring to FIGS. 1-5, an exemplary actuator 24 is a servo motor 26 having a cam 28 attached to a gear box system 30 of the servo motor 26. The servo motor system 26 is integrated into the hand lever 12 and engages the master cylinder/clutch cable attachment assembly that engages the cable so that no external break and connection to either type of standard clutch control system is required. The electric control system 20 advantageously provides for a very compact design that would only require changing out the clutch lever 12 to the servo clutch lever 12, at best. In any situation utilizing a lever master cylinder, only the assembly to the master cylinder would require replacement utilizing the servo clutch lever 12 having the electronic control system 20 mounted thereto.

Alternatively in some situations, the small electronic control system 20 could be located at another location and actuate the clutch by combining the motion of the cable with the actuation of the servo motor. In the case of a hydraulic clutch system, by using a common hydraulic system, another master cylinder could be installed in series with the hose connection from the master cylinder to the clutch slave actuating cylinder so that either the manual control system 11 or the electronic control system 20 can control the clutch.

The cam 28 is mounted on the servomotor gear box system 30 with a roller 32 riding on a camming surface 29. An arm 34 attached to the roller 32 is the attached to the cylinder link 18 to actuate the clutch. It should be noted that advantageously, that the rate of actuation of the cylinder/cable can be changed just by changing the shape of the camming surface 29.

The camming surface 29 includes a portion 36 that has a much lower rate of change of the curved surface, is flat, or even has a slight detent which allows for the servo motor to draw significantly less current when the clutch is fully disengaged. Utilizing the portion 36 on the camming surface 29 requires virtually no torque to hold the clutch in the disengaged configuration, thus reducing the current draw of the servo motor system 26. Minimizing the current draw can be desirable when the clutch is in the fully disengaged position for a long length of time, for instance when the bike is stopped.

Another control scheme that address the issue of the servo motor system 26 having to hold the clutch in a set position for a long time would be a slower trim system that would react to the current drawn by the servo motor 26 and have the characteristic that a second much slower system that would actuate a spring (not shown) to balance out the torque generated by the primary servo system and "trim" out the torque. The primary servo system 26 would be able to instantaneously overcome that force to provide the necessary speed of response in any situation.

Yet another system to minimize actuator power consumptions would be to add a spring counter-balance system to largely balance out the clutch spring. A spring counter-balance system would have greatest effect if it used a negative spring rate spring or mechanism. However, in the event of a failure of the electric clutch control system 20, a mechanical system could optionally be provided to disable the system and return the clutch to only mechanical control. This could be as simple as a system to turn off the power to the servo motor 26 and a lever or knob to return the cam 28 to the engaged position.

Referring to FIGS. 6-10, a parallel configuration of a manual control system 51 and an electronic control system 53 of the clutch is illustrated at 50. The manual control system 51 includes a common lever 54 that engages the hydraulic clutch actuating link 52. The lever 54 can be actuated through a hand grip 56 of the manual control system 51 by rotating the hand grip about the pivot pin or bolt 58.

Alternatively, the computer control system 53 can be utilized where the computer control system 53 is similar to the system 20 and includes cam 62 attached to a gear box system 64 of the servo motor 66. The cam 62 has a similar camming surface 68 to the camming surface 29 wherein the camming surface 68 actuates an arm 70 attached to the common lever 54.

The arm 70 also pivots about the same pivot pin or bolt 58 such that the hand grip 56 or the computer control system 60 would activate the master cylinder through the common lever 53 that engages the clutch cable 52 to actuate the master cylinder directly. Thus, the hand grip 52 of the manual control system 51 could be manipulated or the computer control system 53 that manipulates the cam 62 could directly release the clutch. In the event the clutch lever 54 is manipulated to disengage the clutch, the cam 62 would not affect the position of the lever 54 if the control system 53 is also disengaged, such as when the engine is idled. The parallel configuration includes separately mounting the cam roller follower arm 70 and the hand grip 56 so either system 51 or 53 could actuate the clutch release without affecting the other.

Figure 11:
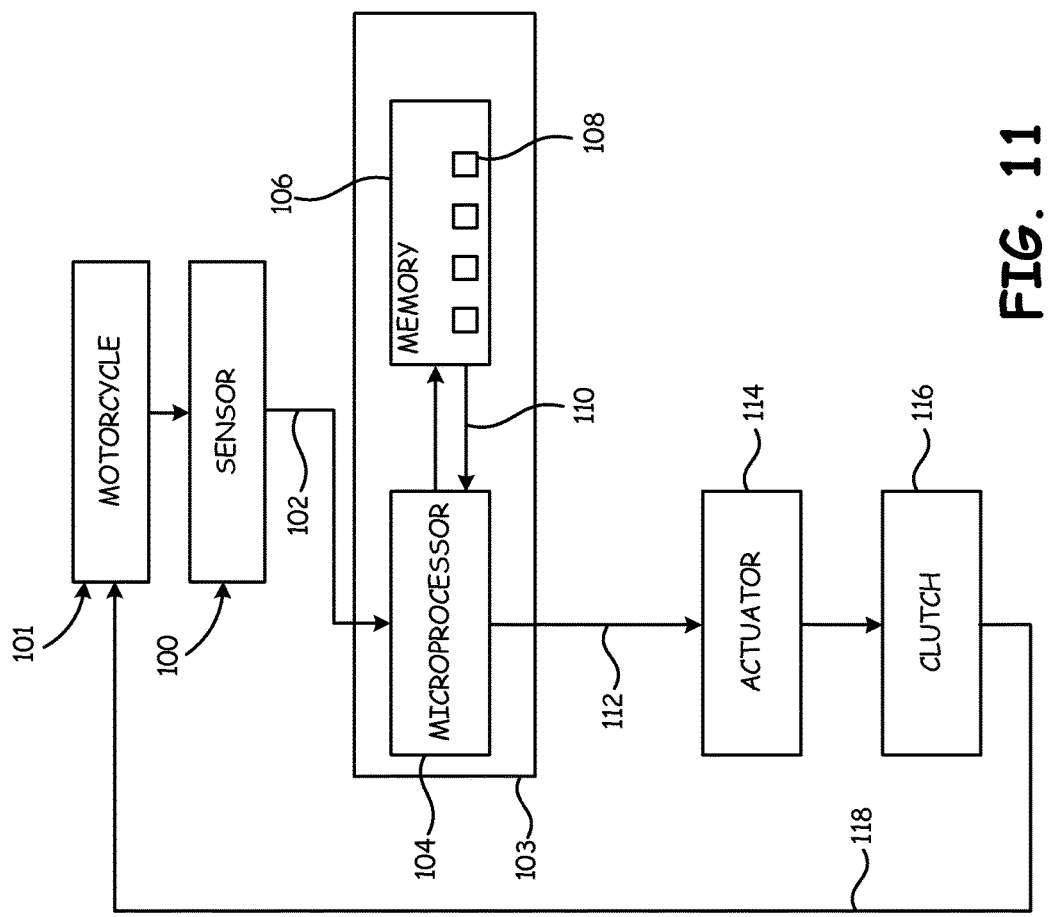
FIG. 11 is a flow chart of a control scheme for controlling the clutch.

Referring to FIG. 11, the electronic control system 20 includes a sensor 100 that senses an operating parameter of the motorcycle and provides a signal 102 to a minicomputer 103 having a microprocessor 104 having memory 106. The memory 106 includes at least one program 108 and typically two or more programs that can be selected by the operator depending upon the conditions and desired performance of the motorcycle. The signal 102 from the sensor 100 is manipulated by one of the programs 108 stored in the memory 106 and an output 110 from the program 108 is transmitted to the microprocessor 104 and the microprocessor 104 outputs a signal 112 to an actuator 114 that manipulates a clutch 116 through the link 18 where the link can either manipulate a master cylinder of a hydraulic control system or a position of the cable in a cable based system to optimize the performance of the motorcycle through the manipulation of the conventional friction clutch 116.

The system may use several sensors 100 at the same time, including, but not limited to a throttle position sensor. The sensor 100 could include a capacitive induction sensor that is configured to sense the spark, and thus provide a speed signal when processed through the selected program 108. Alternatively, the sensor 100 could monitor the alternator AC output and use the signal generated from the sensor 100 to determine the speed of the motorcycle from one of the programs 108. Additionally, an sensor 100 could be positioned on to the engine to provide a higher accuracy signal, such as for instance, an inductive sensor 100 positioned proximate a gear on the engine to provide a higher frequency signal that can be utilized to determine speed or RPMs of the engine. Whatever sensor 100 is utilized, the signal 102 corresponding to the performance and/or speed of the motorcycle is sent to the microprocessor 104, which in turn is used to manipulate the actuator 114 and therefore the position of the clutch 116.

The electronic control system 20 could utilize a feedback control through a control loop 118, such as, but not limited to, proportional control, proportional-integral control and proportional-integral-derivative control. The electronic control system 20 could also utilize a more complex control scheme using feed forward techniques. The same control scheme utilized with the electronic control system 20 can be utilized with the electronic control system 53.

To utilize the computer control system 20, a signal 102 from a sensor 100 is sent to the microprocessor 104 and manipulated by the program 108 such that the output signal 112 from the microprocessor 104 to control the servo motor 26 to actuate the master cylinder. In an alternative embodiment, the servo motor 26 would be utilized to pull the clutch cable to actuate the clutch.

The electronic control system 20 includes the ability to change the selected program 108 for different conditions and/or response settings such as, but not limited to, when the clutch starts to engage, rate of engagement, clutch fully engaged point by reprogramming the program 108 or selecting a different program 108. Changing the response characteristics of the clutch utilizing the electronic control system 20 requires no mechanical changes to the electronic control system 20. This "electronic programmability" of the electronic control system 20 provides for easy installation and allow for the electronic control system 20 to be "tuned" or customized for a specific motorcycle and/or rider.

One such optimized performance program 108 is referred to as keeping the engine "on the pipe." For example, in many two cycle motorcycle engines the greatest torque is obtained when the engine is "on the pipe" where the tuned exhaust is utilized to help the engine take in air or breathe. When an engine is "on the pipe" the RPMs of the engine are at a much higher RPM than the normal operating region to engage the clutch. Expert riders now use this characteristic by manually controlling the clutch so the clutch is partially slipping as the bike is accelerating and the engine operates at this maximum torque region which is a much faster RPM than if the clutch was fully engaged. This technique requires significant skill and experience. The electronic control system 20 could utilize a first program 108 so the normal automatic engagement occurs at the lower normal regions but if the rider wanted the maximum acceleration he would activate a "power switch" that would switch to a second control program 108 to keep the clutch slipping engagement point at the engine RPM where the maximum torque was produced thus the rider would not need to actively control the slipping of the clutch but the electronic controlled clutch would control the engagement of the clutch so the engine was operating at its peak torque region. The power switch can be located on the hand grip 12 or at a remote location, such as the throttle of a motorcycle, which is typically controlled with the right hand of the rider.

Advantages of the present disclosure include that the system would maintain the ability to control the clutch using the typical manual clutch control system 11 and 51 at the same time the electronic clutch system 20 and 53 could control the clutch as necessary. By integrating the electronic control system 20 and 53 into the hand lever 12 and 58, the system 20 and 53 is sufficiently compact to use on an existing motorcycle by replacing the hand lever 12 or the clutch lever module and locating a sensor on the motorcycle to sense the desired performance characteristic or variable. The present electronic control system 20 and 53 does not require a second clutch cable to the actuator and then to the clutch or a second control master cylinder would not need to be integrated into the hydraulic system.

Therefore, the electronic control system 20 and 53, since it does not require centrifugal force to actuate it, could be used on any motorcycle that would typically use a mechanical clutch independent of the rotating speed of the clutch. The present disclosure is more universally useful than any existing mechanical automatic clutch.

Additionally, using the electronic control system 20 and 53 allows for several engagement programs to be integrated into the same clutch control system and allows for switching between the programs as desired by the rider. Thus the rider could select how the clutch worked while riding the motorcycle. The rider could then select the engagement program for the situation the rider is experiencing.

Another use for the electronic clutch system 20 and 53 of the present disclosure would be to disable the clutch system 20 and 53 with a clutch over ride mechanism. One use of the clutch over ride mechanism is when a rider is using the engine as a brake. Normally if the engine gets too slow, the clutch will disconnect and allow the wheels to freewheel. But this additional feature would leave the clutch engaged so the engine can help brake the motorcycle.

By way of example, the clutch over ride mechanism can be utilized when the engine stops when on a steep hill or incline. The stalled engine can be utilized to help brake the descent of the motorcycle by using the stalled engine to lock up the rear wheel. With the standard mechanical centrifugal clutch, the rear wheel will free wheel and not act as a brake when descending the hill with the engine stopped.

The present disclosure could also be useful when a rider needed to clutch start the bike if it stalled. The present disclosure can be utilized when the rider pushes the bike with the clutch in a disengaged position. When a sufficient speed is attained, the clutch is engaged and causes the engine to spin and start.

Advantageously, the electronic control system 20 and 53 may not require any additional sensors, unless very advanced control schemes are require beyond the existing clutch controls. The electronic control system 20 and 53 can utilize as a speed signal either the spark as a RPM input or the multiphase output of the alternator on the engine to provide the RPM signal that the control uses.

The electronic control system 20 and 53 would be able to automatically map the response of the engine to throttle inputs so that the engagement profile could be automatically calculated in the microprocessor 104 and stored in memory 106. As such, no "mechanical tuning" of the clutch engagement characteristics are required utilizing the electronic control system 20 and 53. Thus the control system 20 and 53 can be automatically adapting to any motorcycle engine and clutch.

In more advanced systems such as professional and race level installations, the electronic control system 20 and 53 can optionally have more sensors besides engine RPM. This added sensed information would allow the use of feed forward control schemes and other techniques to help make the system more responsive and improve stability. These added sensors would also allow the monitoring of clutch wear.

The electronic control system 20 and 53 of the present disclosure would be able to support user-tunable multi-point clutch engagement maps. This will allow easy customization of the clutch feel to best fit the rider's preferences and/or to customize motorcycles not well supported by stock or auto-tune clutch maps.

Power consumption of the electrical clutch actuator 26 and 66 while the engine idles is a large concern for motor sizing. To cut power consumption during idle, an actuation cam 28 and 62 with an idle flat surface or detent can be utilized. Alternatively, a non-backdrivable reduction system can be used (like a worm gear or screw). This alternate system has the advantage of holding the clutch actuator 26 and 66 in any position, but is a high friction system which may require a larger motor.

The present disclosure also allows for clutch maps to be formed based on rules that take into account the time-history of the engine rpm or any other sensors. For instance, this could be used to allow seamless engine braking, i.e., after the clutch fully engages it would not disengage until some safe sub-idle rpm was reached. This could also be used to allow "graceful" degradation of function in the event that the clutch actuator over-heats, i.e., by signaling the rider that the clutch actuator is overheating, and by switching to a clutch map that minimizes the use of the clutch actuator.

Although the present invention has been described with reference to preferred embodiments, workers skilled in the art will recognize that changes may be made in form and detail without departing from the spirit and scope of the invention.

What is claimed is:

1. A control system for a motorcycle clutch comprising:
    a manual clutch control system coupled to an actuator for manipulating the clutch; and
    an electronic clutch control system comprising:
        a sensor configured to sense an operating parameter of the motorcycle related to performance or speed of the motorcycle and configured to send a signal relating to the performance or speed of the motorcycle;
        a microcomputer comprising:
            a microprocessor configured to receive as an input the signal from the sensor; and
            memory having a plurality of performance programs wherein one of the plurality of programs can be selected depending upon a desired result wherein the memory is configured to receive the input signal from the microprocessor and is configured to provide an output to the microprocessor based upon the selected program and wherein the microprocessor is configured to send an output signal utilizing feedback control based upon a determined error between the signal relating to the performance or speed of the motorcycle and a setpoint of a variable related to the performance or speed of the motorcycle; and
        a control actuator configured to accept the output signal and configured to manipulate a cable or hydraulic actuator configured to manipulate the clutch to achieve a desired performance characteristic of the motorcycle.

2. The control system of claim 1 and wherein the manual clutch control system comprises a hand lever mounted to a handle bar on the motorcycle wherein the hand lever is configured to be pulled toward the handlebar to disengage the clutch.

3. The control system of claim 2 and wherein at least the microcomputer and the control actuator are mounted to the hand lever.

4. The control system of claim 1 and wherein the sensor is configured to sense the revolutions per minute of an engine of the motorcycle.

5. The control system of claim 1 and wherein the control actuator comprises:
    a servo motor attached to the hand lever; and
    a cam attached to an output of the servo motor wherein the cam comprises a camming surface that is configured to cause the actuator for the clutch to manipulate the clutch.

6. The control system of claim 1 and wherein the plurality of programs are configured to operate the clutch when the clutch starts to engage, to control the rate of engagement, to control when the clutch fully engaged point and/or to maximize power or torque output of the motorcycle.

7. The control system of claim 1 and wherein any of the plurality of programs to control the clutch can be selected as desired by an operator.

8. The control system of claim 1 and wherein the manual clutch control system and the electronic clutch control system are configured in series.

9. The control system of claim 1 and wherein the manual clutch control system and the electronic clutch control system are configured in parallel.

10. The electronic control system of claim 1 and wherein the feedback control utilizes a proportional, proportional-integral or proportional-integral-derivative control scheme for the feedback control.

11. A method for controlling a position of a clutch on a motorcycle to manipulate a drive to a wheel, the method comprising:
    utilizing a manual clutch control system coupled to an actuator for manipulating the clutch; or
    utilizing an electronic clutch control system to manipulate the clutch, the electronic control comprising:
        sensing a parameter of the motorcycle indicative of performance and/or speed with a sensor;
        sending a signal from the sensor indicative performance and/or speed to a microcomputer having a microprocessor and memory wherein the memory stores a plurality of plurality of programs, wherein each program is related to a different performance result of the motorcycle;
        processing the signal from the sensor through one of the programs to determine an error between the signal relating to the performance or speed of the motorcycle and a setpoint of a variable related to the performance or speed of the motorcycle; and
        sending an output signal based upon the determined error from the microprocessor to an actuator which causes a cable or hydraulic actuator to manipulate a position of the clutch and adjust the performance of the motorcycle utilizing feedback control.

12. The method of claim 11 and wherein the sensed parameter is revolutions per minute of an engine of the motorcycle.

13. The method of claim 11 and wherein the feedback control utilizes a proportional, proportional-integral or proportional-integral-derivative control scheme for the feedback control.

14. The method of claim 11 and wherein the actuator comprises:
    a servo motor attached to a hand lever; and
    a cam attached to an output of the servo motor wherein the cam comprises a camming surface; and
    a follower configured to engage the camming surface and wherein when the camming surface is moved, the follower is configured to move and actuate the actuator for the clutch.

15. The method of claim 14 and wherein the camming surface comprises a flat portion or a detent to accept the follower when the clutch is in a disengaged position.

16. The method of claim 11 and wherein the plurality of programs are configured to operate the clutch when the clutch starts to engage, to control the rate of engagement, to control when the clutch fully engaged point and/or to maximize power or torque output of the motorcycle.

17. The method of claim 11 and wherein any of the plurality of programs to control the clutch can be selected as desired by an operator.

18. The method of claim 11 and wherein each of the plurality of programs can be reprogrammed to adjust the output signal to provide a desired response to the actuator.

* * * * *

UNITED STATES PATENT AND TRADEMARK OFFICE
CERTIFICATE OF CORRECTION

Page 1 of 1

PATENT NO. : 10,184,532 B2
APPLICATION NO. : 15/031075
DATED : January 22, 2019
INVENTOR(S) : Martin E. Lawson and William E. Lawson It is certified that error appears in the above-identified patent and that said Letters Patent is hereby corrected as shown below:

On the Title Page

Item (54) and In the Specification, Column 1, Lines 1-2, "ELECTRONICS CONTROL OF MOTORCYCLE CLUTCH" should read --ELECTRONIC CONTROL OF MOTORCYCLE CLUTCH--.

Signed and Sealed this
Fifteenth Day of March, 2022

Drew Hirshfeld
*Performing the Functions and Duties of the
Under Secretary of Commerce for Intellectual Property and
Director of the United States Patent and Trademark Office*